United States Patent
Nanba et al.

(10) Patent No.: US 9,005,839 B2
(45) Date of Patent: Apr. 14, 2015

(54) METHOD FOR LAMINATING COMPOSITE SHEET USING RELEASE FILM, LAMINATE OBTAINED BY THE METHOD, AND RELEASE FILM FOR USE IN THE METHOD

(75) Inventors: Takafumi Nanba, Tokyo (JP); Naoki Ohashi, Tokyo (JP)

(73) Assignee: W. L. Gore & Associates, Co., Ltd., Tokyo (JP)

(*) Notice: Subject to any disclaimer, the term of this patent is extended or adjusted under 35 U.S.C. 154(b) by 39 days.

(21) Appl. No.: 13/805,133

(22) PCT Filed: Jul. 1, 2011

(86) PCT No.: PCT/JP2011/065631
§ 371 (c)(1),
(2), (4) Date: Feb. 11, 2013

(87) PCT Pub. No.: WO2012/002579
PCT Pub. Date: Jan. 5, 2012

(65) Prior Publication Data
US 2013/0157163 A1      Jun. 20, 2013

(30) Foreign Application Priority Data

Jul. 1, 2010   (JP) ................................. 2010-151319

(51) Int. Cl.
*H01M 4/88* (2006.01)
*H01M 8/10* (2006.01)
(Continued)

(52) U.S. Cl.
CPC ............. *H01M 8/1006* (2013.01); *B32B 37/10* (2013.01); *B32B 37/24* (2013.01);
(Continued)

(58) Field of Classification Search
None
See application file for complete search history.

(56) References Cited

U.S. PATENT DOCUMENTS 6,054,230 A    4/2000   Kato
(Continued)

FOREIGN PATENT DOCUMENTS

| JP | 06-203851 | 7/1994 |
| JP | 2005-294115 | 10/2005 |

(Continued)

OTHER PUBLICATIONS

PCT/JP2011/065631 International Search Report dated Oct. 11, 2011.
(Continued)

*Primary Examiner* — Patrick Ryan
*Assistant Examiner* — Wyatt McConnell
(74) *Attorney, Agent, or Firm* — Allan M. Wheatcraft

(57) ABSTRACT

In a carbon black (CB)/PTFE composite porous sheet that can be used as a gas diffusion layer in an electrochemical device in applications involving electro chemical reaction such as a polymer electrolyte fuel cell, electrolysis, gas sensor and the like, wrinkle or breakage may be produced due to its flexibility. A method is provided which makes it possible to easily handle this sheet that is difficult to handle, without giving rise to wrinkle or breakage.

The present invention relates to a method for laminating the composite sheet on MEA, comprising the steps of:
providing a membrane electrode assembly (MEA);
providing a composite sheet comprising functional powder and polytetrafluoroethylene (PTFE);
providing a release film;
superimposing the composite sheet on the release film and pressing them at normal temperature;
superimposing the composite sheet having the release film pressed at normal temperature thereto on MEA and hot-pressing them; and
separating the release film from the composite sheet.

7 Claims, 2 Drawing Sheets

(51) Int. Cl.
  *B32B 37/10* (2006.01)
  *B32B 37/24* (2006.01)
  *C25B 9/10* (2006.01)
  *H01M 8/02* (2006.01)
  *B32B 37/26* (2006.01)
  *B32B 38/10* (2006.01)

(52) U.S. Cl.
  CPC ...... *B32B 2037/268* (2013.01); *B32B 2309/02* (2013.01); *B32B 2309/027* (2013.01); *B32B 2309/105* (2013.01); *B32B 2309/12* (2013.01); *B32B 2457/18* (2013.01); *C25B 9/10* (2013.01); *H01M 8/0234* (2013.01); *H01M 8/0239* (2013.01); *H01M 8/0243* (2013.01); *H01M 8/1004* (2013.01); *H01M 2008/1095* (2013.01); *Y02E 60/521* (2013.01); *B32B 38/10* (2013.01)

(56) References Cited

U.S. PATENT DOCUMENTS

| | | | |
|---|---|---|---|
| 2006/0177727 A1* | 8/2006 | Ruth et al. | 429/44 |
| 2006/0236886 A1* | 10/2006 | Leenders et al. | 101/492 |
| 2007/0105008 A1* | 5/2007 | Gu et al. | 429/44 |
| 2010/0043954 A1 | 2/2010 | Shimoda et al. | |

FOREIGN PATENT DOCUMENTS

| | | |
|---|---|---|
| JP | 2006-187913 | 7/2006 |
| JP | 2007-1302 | 1/2007 |

OTHER PUBLICATIONS

European Search Report EP11801035, 6 pages, Feb. 13, 2014.

* cited by examiner

METHOD FOR LAMINATING COMPOSITE SHEET USING RELEASE FILM, LAMINATE OBTAINED BY THE METHOD, AND RELEASE FILM FOR USE IN THE METHOD

FIELD OF THE INVENTION

The present invention relates in general to a technology of manufacturing electrochemical devices in applications which involve electrochemical reactions such as solid polymer type fuel cell (polymer electrolyte fuel cell: PEFC), electrolysis, gas sensor, or the like, and in particular, the present invention relates to a method for laminating a composite film formed of functional powder and PTFE on other polymer film by hot-pressing using a mold release film.

BACKGROUND ART

A fuel cell utilizing hydrogen and oxygen attracts increasing attention as clean energy generation means that impose little environmental load since its only reaction product is only water in principle. A polymer electrolyte fuel cell, among others, is easy to handle and is promising in terms of output power density so that research and attempts for its practical application has become more and more active. Field of its application is very wide, including, for example, a power source for moving body such as an automobile or a bus, a stationary power source for a common home, a power supply for a small mobile terminal, and the like.

A polymer electrolyte fuel cell is composed by laminating a multiplicity of single cells each having typical structure as shown in FIG. 1, in which a polymer electrolyte membrane (ion exchange membrane) 10 is sandwiched between a pair of catalyst electrode layers 20, 21 from both sides, and these catalyst electrode layers 20, 21 are sandwiched between a pair of gas diffusion layers (also referred to as porous support layers or carbon fiber current collector layer) 40, 41. The gas diffusion layers 40, 41 are opened on the outside to gas passages (fuel gas passage 50, oxygen containing gas passage 51) formed by separators 60, 61. Fuel (such as $H_2$) gas introduced from the passage 50 flows through a first gas diffusion layer (anode-side gas diffusion layer) 40, and then in a first catalyst electrode layer (anode, fuel electrode) 20, generates protons ($H^+$) while emitting electrons in an anode reaction shown below. The protons flow through the polymer electrolyte layer 10, and then in a second catalyst electrode layer (cathode, oxygen electrode) 20, generates $H_2O$ and accepts electrons in a cathode reaction shown below.

anode reaction: 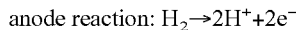
cathode reaction: 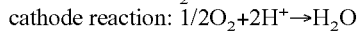

As a conventional method for laminating and bonding a solid polyelectrolyte film to an electrode sheet (a catalyst layer formed on a gas diffusion layer), a bonding method has been disclosed in which a metallic mesh and a polytetrafluoroethylene sheet are additionally laminated and hot-pressing is carried out for bonding (see Patent Literature 1). It is disclosed that, with this method, the problems of damage of electrode sheets and softening of electrode sheets resulting in sticking to the press plate during hot-pressing carried out on the laminate formed of the solid polyelectrolyte film and the electrode sheets can be overcome.

CITATION LIST

Patent Literature

Patent Literature 1: Japanese Unexamined Patent Application Publication No. H06-203851

SUMMARY OF THE INVENTION

Problem to be Solved by the Invention

It is possible to use a carbon black (CB)/PTFE composite porous sheet as a gas diffusion layer in an electrochemical device in applications involving electro chemical reaction such as a polymer electrolyte fuel cell, electrolysis, gas sensor and the like. In such a case, thickness of the composite porous sheet is about a few hundreds μm or less, and is highly flexible. Therefore, when the composite porous sheet is utilized as a single separate sheet, the sheet may often break or wrinkle.

When this sheet is to be utilized as a gas diffusion layer for a polymer electrolyte fuel cell, the sheet needs to be laminated with a catalyst electrode layer in a membrane electrode assembly (MEA). However, even if the processing is carried out carefully, the sheet may break or wrinkle during the laminating process. Thus, there is a problem that this leads to product loss.

When the composite porous sheet is prepared or transported, the composite porous sheet is placed on a support film having sufficient rigidity such as polyethyleneterephthalate (PET) film or the like. A release film such as a polypropylene (PP) film or PET film is sandwiched between the composite porous sheet and the support film so as to be able to release the composite porous sheet from the support film later. However, there is still a problem that, since adhesion of the release film to the composite porous sheet is not good, the composite porous sheet may slip off from the release film during preparation and transport of the composite porous sheet, and wrinkle or breakage of the composite porous sheet may occur.

Also, when the catalyst electrode layer of MEA is to be laminated with and integrated to CB/PTFE composite porous sheet by pressing, removal of the release film before pressing may lead to shift in position of the CB/PTFE composite porous sheet. If pressing is attempted without removing the release film, this gives rise to a problem of close and firm adhesion (transfer) of the release film to the composite porous sheet by pressing. The problem of the transfer to the release film is particularly noticeable in hot pressing which involves heating step.

There has been no release film that can overcome all of these problems.

Means for Solving the Problem

The present invention has been done in order to resolve above-described problems, and following means are provided to solve these problems.

(1) A method for laminating a composite sheet to a MEA comprising the steps of:
providing a MEA (membrane electrode assembly);
providing a composite sheet comprising functional powder and polytetrafluoroethylene (PTFE);
providing a release film;
pressing the composite sheet overlaid on the release film at normal temperature;
hot-pressing the composite sheet pressed to the release film at normal temperature overlaid on the MEA; and
releasing the release film from the composite sheet.

(2) The method according to (1), characterized in that the 180 degree peel adhesive strength (in accordance with JIS K6854-2: 1999) is not less than 0.005 N/cm and not more than 0.025 N/cm.

(3) The method according to (1) or (2), characterized in that the temperature of the hot pressing is in the range of 100° C.~140° C.

(4) The method according to any one of (1)~(3), characterized in that the functional powder includes at least carbon black, activated carbon, or a mixture thereof.

(5) The method according to any one of (1)~(4), characterized in that the composite sheet is a porous body.

(6) The method according to any one of (1)~(5), characterized in that, after the release film is removed from the composite sheet, a part or all of the composite sheet is not transferred to the release film.

(7) The method according to any one of (1)~(6), characterized in that neither shift in position of the composite sheet relative to the release film, nor wrinkle nor breakage of the composite sheet does not take place in the composite sheet pressed to the release film at normal temperature.

(8) A laminate of a composite sheet and a MEA, which is manufactured by the method according to any one of (1)~(7).

(9) A laminate characterized in that a composite sheet comprising functional powder and polytetrafluoroethylene (PTFE) is overlaid on a release film used exclusively in the method according to (1)~(7), and is pressed at normal temperature.

(10) The laminate according to (9), characterized in that the laminate is in the form of a roll.

Advantageous Effect of the Invention

In the composite sheet with a release film bonded thereto according to the present invention, the composite sheet is closely and inseparably attached to the release film and the release film has suitable rigidity, so that wrinkle or breakage of the composite sheet does not occur during handling of the composite sheet, and the composite sheet can be handled easily. Handling of the composite sheet includes preparation and transport in addition to laminating of the composite sheet.

In pressing of the composite sheet with the release film bonded thereto and the MEA overlaid thereto according to the present invention, adhesion of the composite sheet to the release film (transfer to the release film) does not take place, nor is the composite sheet broken in pressing. Therefore, neither shift in position nor wrinkling of the composite sheet occurs, and the release film can be separated from the composite sheet. In this way, yield of the bonding process by pressing of the composite sheet (gas diffusion layer) to the membrane electrode assembly (MEA) of a polymer electrolyte fuel cell can be remarkably improved.

PREFERRED MODE FOR CARRYING OUT THE INVENTION

Now, the present invention will be described in detail below with reference to drawings.

Figure 1:
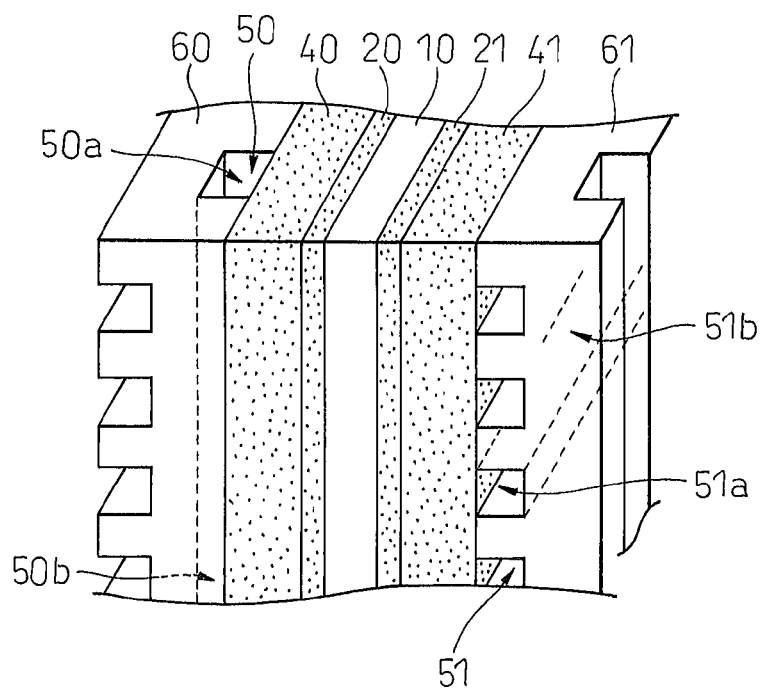
FIG. 1 is a schematic perspective view showing an exemplary fuel cell (single cell)

Referring to FIG. 1, a membrane electrode assembly (MEA) will be described. A membrane electrode assembly (MEA) is composed of a polymer electrolytic membrane (ion exchange membrane) 10 sandwiched between a pair of catalyst electrode layers 20, 21 on both sides.

As the polymer electrolytic membrane 10, a perfluoro-electrolyte and a hydrocarbon electrolyte are preferable, and a perfluoro-electrolyte is more preferable. As perfluoro-electrolytic membranes, sulfonic acid based electrolytic membranes [for example, Nafion®, manufactured by DuPont, Co., GORE-SELECT®, manufactured by Japan Gore-tex, Inc., and the like] are preferable, and an electrolutic membrane based on perfluoro sulfonic acid resin reinforced with expanded porous polytetrafluoroethylene [GORE-SELECT®, manufactured by Japan Gore-tex, Inc.] is most preferable.

It is recommended that EW (Equivalent Weight) of the polymer electrolyte membrane is, for example, not less than 700 (preferably not less than 900) and not more than 1500 (preferably not more than 1300). It is desired that thickness of the polymer electrolyte membrane is, for example, not less than 10 μm (preferably not less than 15 μm) and not more than 100 μm (preferably not more than 60 μm).

As the catalyst electrode layers 20, 21, conventionally known electrodes can be used, for example, those made from a paste-like ink in which electrically conductive carbon fine particles such as carbon black (of mean particle size of about 20~100 nm) carrying fine particles (desirably of mean particle size of 10 nm or less) of platinum or an alloy of platinum and other metal (for example, Ru, Rh, Mo, Cr) on the surface and liquid containing perfluoro sulfonic acid resin are mixed uniformly in a suitable solvent (for example, alcohols) can be used.

It is desirable that amount of platinum of the catalyst electrode layer 20 on anode side (fuel electrode) is about 0.1~0.5 mg/cm$^2$ in equivalent metal platinum, and amount of platinum of the catalyst electrode layer 21 on cathode side (air electrode) is about 0.3~0.8 mg/cm$^2$ in equivalent metal platinum.

Thickness of the catalyst electrode layer is, for example, about 5~30 μm.

The composite sheet comprising functional powder and polytetrafluoroethylene (PTFE) can be laminated to the catalyst electrode layers 20, 21 of MEA to compose gas diffusion layers 40, 41. When used as a gas diffusion layer, it is desirable that the composite sheet has at least permeability (gas permeability), electrical conductivity, and moisture permeability (hydrophobicity, or water repellency).

The functional powder may include any of inorganic powder such as electrically conductive carbon powder, silica, alumina, titanium oxide that is suitable for specific purpose or application. However, in order for the composite sheet to exhibit electrical conductivity, gas permeability, and moisture permeability, electrically conductive carbon powder is particularly preferable. As electrically conductive carbon powder, for example, carbon blacks (C/B) such as furnace black, lamp black, thermal black, acetylene black, or the like, activated carbon, and graphite can be used. These can be used singly or in a mixture of two or more of them. Preferred electrically conductive carbon powder is acetylene black or a mixture thereof. Acetylene black or a mixture thereof is excellent in electrical conductivity, water repellency and chemical stability.

Above-mentioned PTFE is used as a binder of the functional powder to form a sheet (to form a film), and is suitable since it covers the functional powder, in particular surface of the functional powder, so as to impart water repellent property.

Amount of PTFE, expressed as percentage of total amount of the functional powder and PTFE, is, for example, about 5 mass % or more (preferably 7 mass % or more, more preferably 10 mass % or more) and about 60 mass % or less (preferably 50 mass % or less, more preferably 45 mass % or less).

The composite sheet may contain, in addition to above-mentioned PTFE, other fluorocarbon polymers as necessary. Fluorocarbon polymers include, for example, copolymers of tetrafluoroethylene (copolymers of fluorine containing monomers such as hexafluoro polypropyrene, and non-fluorine containing monomers such as ethylene, and the like), polyvinylidene fluoride resin, polychloro-trifluoro ethylene resin, etc. It is possible to adjust water repellency of the composite sheet by adding fluoro resin. It is recommended that content of fluoro resin in the composite sheet is, for example, 0.5 mass % or more, preferably 5 mass % or more, and more preferably 10 mass % or more. On the other hand, if content of fluoro resin is excessive, water permeability of the composite sheet is lowered, and flooding is more likely to occur when used as a gas diffusion layer. Therefore, content of fluoro resin in the composite sheet is, for example, about 65 mass % or less, preferably 50 mass % or less, and more preferably 30 mass % or less.

The composite sheet in the present invention can be fabricated by forming a sheet from mixture (mixture, slurry, and the like) in which functional powder and PTFE, and other fluoro resins as necessary are mixed homogeneously.

Details of the method of mixing and method of sheet formation are not specifically limited, and those skilled in the art can implement these methods with suitable modifications. Exemplary manufacturing method is, for example, as shown below. The mixture (mixture, slurry, etc.) can be prepared in accordance with known methods. For example, the mixture can be prepared by a dry process or a wet process, and the slurry can be prepared by a wet process. A dry process is a process of mixing fine powder of functional powder with fine powder of PTFE. Thus, in dry process, the mixture can be prepared by loading above-mentioned fine powders into a suitable mixer (for example, V blender), stirring and mixing, and adding suitable processing aid (for example, mineral spirit) to be absorbed by the mixture. Fine powder of the functional powder can be obtained by pulverizing the functional powder using a known pulverizer (for example, ball mill, pin mill, homogenizer, and the like). Fine powder of PTFE can be most simply utilized by purchasing marketed product. In the process of absorption of processing aid, it is recommended that the mixture be suitably warmed (for example, at about 40~60° C., in particular about 50° C.) after addition of the processing aid.

On the other hand, wet process is a method in which functional powder and PTFE are mixed in water. That is, in wet process, raw material (functional powder, PTFE) that has been pulverized in order to allow dispersion can be mixed in water in the presence of a surfactant to prepare slurry (ink). At the time of mixing, if the slurry (ink) is subjected to mechanical shear, or if precipitant (alcohol, etc.) is added to the slurry, co-precipitation of the functional powder and PTFE takes place. After filtering and drying the co-precipitate, a mixture can be prepared by causing the dry matter to absorb suitable processing aid in the same manner as in dry process. Fine functional powder can be prepared in the same manner as in dry process described above, but it is more convenient to add it to water with surfactant and to pulverize it with wet pulverizing means (for example, homogenizer, etc.) in order to disperse it in water. As for PTFE, it is more convenient to utilize marketed aqueous PTFE dispersion.

In order to form a sheet from the mixture, a paste extrusion method can be applied to PTFE. That is, the mixture is pelletized in preliminary molding, and various known method can be used. For example, the pellet can be molded by extrusion from a die (extrusion molding method), or the pellet can be extruded in the form of a chord and the chord is pressed between two rolls and dried (bead rolling method).

The composite sheet may be porous, and thickness and air permeability (porosity) of the composite sheet can be adjusted by suitably modifying the sheet forming process. For example, when primary molded sheet is thick in the extrusion molding method or bead rolling method, rolling process can be repeated until a predetermined thickness is obtained. In case where density is too high to achieve sufficient air permeability due to fabrication conditions, die drawing can be utilized to increase air permeability. By suitable combination of rolling and drawing, sheet thickness and air permeability can be adjusted. On the other hand, in coating method, coating and drying can be repeated until a predetermined thickness of the composite sheet is achieved, and suitable rolling and drawing may be adopted to adjust thickness and air permeability further. Electric resistance in thickness direction of the composite sheet as well as moisture permeability can also be adjusted by rolling and drawing.

In drying step of the extrusion molding method and the bead rolling method, it is recommended that the sheet be heated to temperature (for example, about 150~300° C., in particular about 200° C.) so as to allow removal of processing aid (mineral spirit, etc.) by volatilization, and in drying step of the coating method, it is recommended that the sheet be heated to temperature (for example, about 100~300° C., in particular about 120° C.) so as to allow removal of water by volatilization.

Also in drying process, it is recommended to carbonize organic impurities (for example, surfactant used in dry process) so as to render them harmless. If the surfactant remains, moisture permeability of the composite sheet becomes remarkably high. By carbonizing the surfactant, moisture permeability can be lowered to a suitable level. Temperature of carbonization may be, for example, about 300~400° C. (in particular about 350° C.) Method of removing organic impurities is not limited to carbonization as described above, and various methods can be suitably adopted in accordance with the type of impurities. Depending on type of surfactant, removal by volatilization is made possible by heating to temperature of 250° C. or higher. Removal by extraction is also possible by using suitable solvents (for example, alcohols).

Thickness of the gas diffusion layer 40, 41 consisting of the composite sheets is, for example, 100~500 μm.

As the release film, plastic film such as polypropylene, polyester, polycarbonate, cellophane®, acetate, PTFE (polytetrafluoroethylene), PFA (tetrafluoro ethylene-perfluoro alkylvinyl ether copolymer), FEP (tetrafluoroethylene-hexafluoropropylene copolymer), EPE (tetrafluoroethylene-hexafluoropropylene-perfluoro alkylvinyl ether copolymer), ETFE (tetrafluoroethylene-ethylene copolymer), PCTFE (polychlrotrifluoroethylene), ECTFE (chlorotrifluoroethylene-ethylene copolymer), PVF (polyvinyl fluoride), THV (tetrafluoroethylene-hexafluoropropylene-vinylidene fluoride copolymer), VDF-HFP (vinylidene fluoride-hexafluoropropylene copolymer), TFE-P (vinylidene fluoride-propylene copolymer), and the like, can be mentioned. From the viewpoint of heat resistance, chemical stability, separability, rigidity, etc., polyester based plastic film, especially fluoro resin coated one, is desirable. As fluorine coated polyester, EMBLET FZ manufactured by UNITIKA Ltd. may be use. In view of balance of easy handling and cost, thickness of the release film is preferably 1~100 μm, and more preferably 2~60 μm. If thickness is 1 μm or more, the film is easy to handle, and if thickness is 100 μm or less, rigidity of the film is not excessively high and the film can be handled easily.

Figure 2:
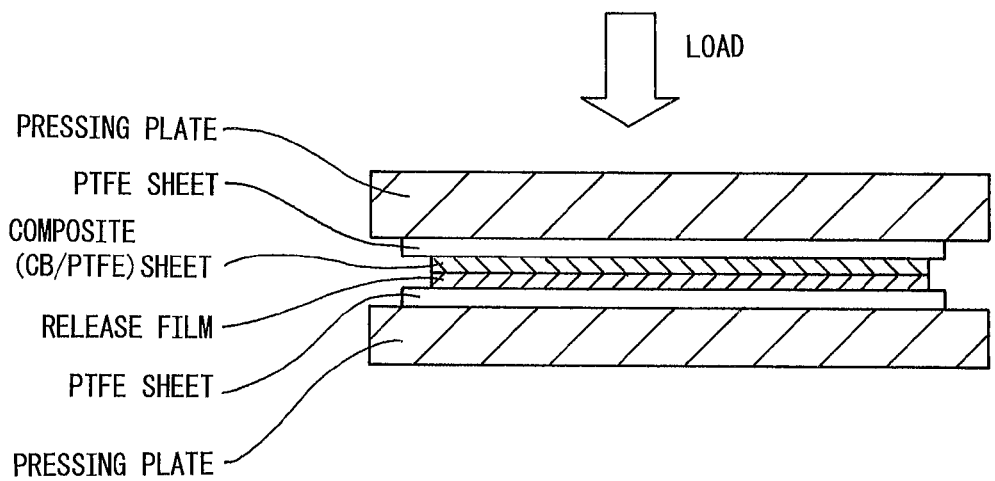
FIG. 2 is a view useful for explaining a pressing method.

The composite sheet is subjected to pressing at normal temperature with the release film overlaid thereto. Method of pressing is not especially limited. Although those skilled in the art can implement the method with suitable modification, an exemplary method will be given below. As shown in FIG. 2, a release film and a composite sheet are laminated with a pressing die (lower die) having PTFE sheet applied thereto, and a pressing die (upper die) having PTFE sheet applied thereto is placed on top of the composite sheet to sandwich the laminate, and usually is pressed under the conditions of 20° C.±15° C. and 50~200 kgf/cm$^2$ for 1~300 seconds so as to closely adhere the composite sheet to the release film. If the composite sheet is pressed to the release film at normal temperature, the composite sheet is closely adhered to the release film so that, in later handling, the composite sheet is not shifted in position relative to the release film, and wrinkle or breakage of the composite sheet is unlikely to occur.

The composite sheet pressed to the release film at normal temperature is overlaid on MEA described above, and is subjected to hot pressing. If the composite sheet is used as a gas diffusion layer, the composite sheet (not the release film) is overlaid on MEA so as to come into contact with MEA. Since the composite sheet has been pressed to the release film, wrinkle or breakage is not produced when overlaid on MEA.

Hot pressing can adopt same method as above-described pressing except that it is carried out not at normal temperature but under heating. Heating temperature needs to be not higher than melting point or decomposition temperature of the material of the release film. In a polymer electrolyte fuel cell, if the gas diffusion layer is laminated in one unit to MEA, lower bound of heating temperature is not lower than 80° C., preferably not lower than 100° C., and upper bound of heating temperature is not higher than 150° C., preferably not higher than 140° C.

After hot pressing, the release film is separated from the composite sheet. At this time, 180 degree peel adhesive strength of the release film is not less than 0.005 N/cm and not more than 0.025 N/cm. Since adhesive strength is not less than 0.005 N/cm, the composite sheet is sufficiently adhered to the release film, and no shift in position of the composite sheet relative to the release film is produced, and wrinkle or breakage of the composite sheet does not occur. Since adhesive strength is not more than 0.025 N/cm, the release sheet can be easily separated whenever it needs to be separated.

Figure 3:
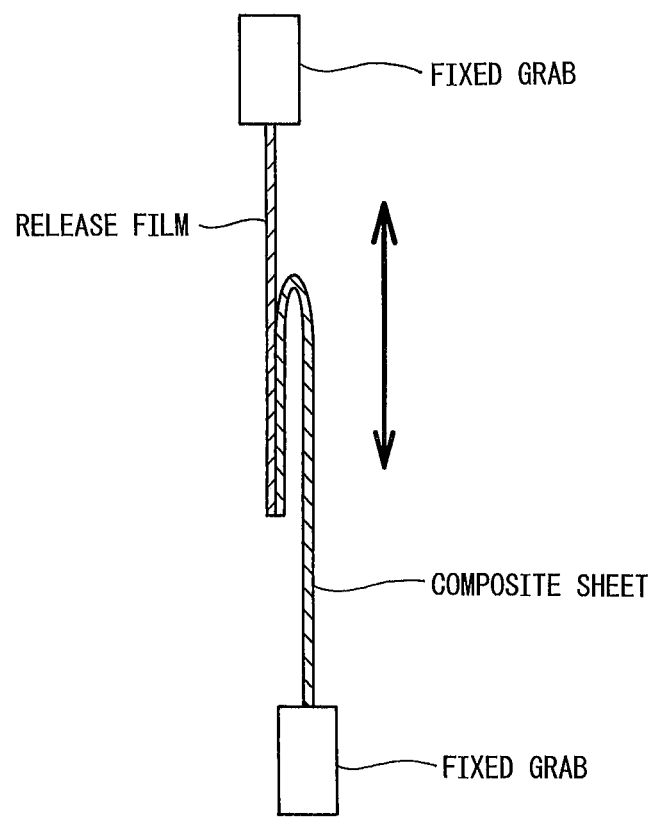
FIG. 3 is a view useful for explaining a measurement method for measuring the peel adhesive strength.

180 degree peel adhesive strength is determined in accordance with JIS K6854-2: 1999, Peel adhesive strength test method—Part 2: 180 degree peel strength. Measurement method for measuring peel adhesive strength will be described below with reference to FIG. 3. An end of the hot-pressed release film (20 mm in width) is peeled back. The peeled back portion of the release film is held with a fixed grab. The composite sheet and MEA are held in the portion where the release film is peeled back with another fixed grab. As shown in FIG. 3, one fixed grab is moved relative to the other fixed grab at an angle of 180 degrees at moving speed of 100 mm/min for distance of 200 mm. Pulling force exerted to the fixed grab while in motion is measured to obtain 180 degree peel adhesive strength.

After the release film is separated from the composite sheet, a part or all of the composite sheet is not transferred to the release film. Whether the composite sheet is transferred or not is determined by visual inspection. When the composite sheet contains electrically conductive carbon powder (carbon black, etc.) as functional powder, if the composite sheet is transferred to the release film, black portion transferred to the release film can be detected by visual inspection.

The present invention relates to a laminate of the composite sheet on MEA fabricated by the method as described above. On the side in which the composite sheet (gas diffusion layer) is not integrally laminated (MEA side), the composite sheet can be integrally laminated to form one unit. Further, as shown in FIG. 1, separators 60, 61 can be combined to make a single cell of polymer electrolyte fuel cell.

The present invention also relates to a laminate formed by superimposing a composite sheet comprising functional powder and polytetrafluoroethylene (PTFE) onto a release film exclusively used in the method described above and by pressing them at normal temperature. After pressing at normal temperature, the release film has 180 degree peel adhesive strength of not less than 0.005 N/cm and not more than 0.025 N/cm. Since adhesive strength is not less than 0.005 N/cm, the composite sheet is sufficiently adhered to the release film, and no shift in position of the composite sheet relative to the release film is produced, and wrinkle or breakage of the composite sheet does not occur. Since adhesive strength is not more than 0.025 N/cm, the release sheet can be easily separated whenever it needs to be separated. Thus, with this laminate, the composite sheet can be handled easily even before hot pressing.

The present invention also relates to the above-described laminate in the form of a roll. The above-described laminate has the composite sheet overlaid on the release film and is subjected to pressing at normal temperature so that the composite sheet is securely adhered to the release film. Therefore, when this laminate is shaped in the form of a roll, wrinkles or breakage of the composite sheet do not occur. When the composite sheet is taken out from the roll, wrinkles or breakage of the composite sheet do not occur since the composite sheet is securely adhered to the release film. The form of a roll is also advantageous for storage and transport of the composite sheet.

EXAMPLES

The present invention will be described in more detail below with reference to specific examples. It is to be understood that the present invention is not limited to following examples, but can be implemented with suitable modifications within the spirit and scope of the invention described above and later. All these modifications are included in the technical scope of the present invention.

(Preparation of the Composite Sheet)

Acetylene black (electrically conductive carbon powder) was gently added to water so as not to be scattered, and was stirred with a stirring rod to cause water to be absorbed by the acetylene black. Then, a homogenizer was used to stir and disperse acetylene black. Aqueous dispersion of acetylene black was thus produced.

A predetermined amount of aqueous dispersion of PTFE (trade name: D1-E, manufactured by Daikin Industries Ltd.) was added to the aqueous dispersion of acetylene black, and was gently stirred with a mixer to prepare homogeneously mixed dispersion. Then, rotation speed of the mixer was increased to induce co-precipitation of PTFE and acetylene black. The co-precipitate was filtered and collected, and spread in a thin sheet on a stainless steel vat, and dried overnight in a drier at 120° C. to obtain mixed powder of acetylene black (electrically conductive carbon powder) and PTFE.

Mineral spirit (trade name: IP Solvent 1016, manufactured by Idemitsu Kosan Co.) was added to the mixed powder as processing aid. The mixture was pelletized, and the pellet was extruded in the form of a tape by an extruder, and rolled with a two-roll mill to form a film. The film was further rolled plural times with the two-roll mill to adjust thickness and density of the film. The rolled film was dried in a drier at 200° C. for 8 hours to remove mineral spirit, and then heat treatment at 350° C. was carried out for 5 minutes, and a composite sheet comprising functional powder (acetylene black) and PTFE was obtained.

The composite sheet has following properties: mass ratio of acetylene black to PTFE: 60/40; mean thickness: 25 μm; moisture permeability: 3300 g/m²hr; penetration electric resistance: 8.2 mΩcm².

Mass ratio, thickness, moisture permeability, and penetration electric resistance described above were determined as follows.

(Mass Ratio)

Mass ratio was calculated based on the amount of acetylene black used, and solid content of the aqueous dispersion of PTFE.

[Mean Thickness]

Cross sectional area of the humidity adjusted film was measured with an optical microscope, and the cross sectional area was divided by the length of the base to obtain mean thickness.

[Moisture Permeability]

Moisture permeability was determined in accordance with the method of JIS L 1099 (B-1).

[Penetration Electric Resistance]

The humidity adjusted film was sandwiched between a pair of gold-plated flat metal blocks (of area of 2 cm²) [pressure: 981 kPa (10 kgf/cm²), four terminal method], and value of electric resistance was measured with a mΩ meter (trade name: Digital Battery mΩ Meter (Model AX-126B), manufactured by Adex Co.) with applied AC current at 1 kHz (current: 100 mA). Penetration electric resistance was calculated according to following formula penetration electric resistance=measured resistance (mΩ)×2(cm²)

(Release Film)

Various release films were used in Inventive Example and in Comparative Examples. Release films used are shown in Table 1.

(Pressing)

Pressing was performed with the composite sheet overlaid on the release film. As shown in FIG. 2, the release film and the composite sheet were laminated to a pressing die (lower die) having PTFE sheet applied thereto, and were sandwiched on top of the composite sheet by a pressing die (upper die) having PTFE sheet applied thereto, and were pressed under 115 kgf/cm² for 4 minutes to bring the composite sheet and the release film into close contact. Pressing was performed at normal temperature (25° C.) and high temperature (130° C.)

(180° Peel Adhesive Strength)

Measurement was carried out on the composite sheet and the release film pressed at normal temperature and at 130° C., respectively, with a tensile tester in accordance with the method of JIS K 6854-2. FIG. 3 is a schematic view showing the method for measuring peel adhesive strength. One end of the release film (20 mm in width) subjected to hot pressing was peeled and folded back. The folded-back portion of the release film was held in a fixed grab. The composite sheet in the portion having the release film folded back was held in another fixed grab. As shown in FIG. 3, one of the fixed grabs was moved relative to the other fixed grab at an angle of 180 degrees at moving speed of 100 mm/min for moving distance of 200 mm. Pulling force exerted to the fixed grab at the time of moving was measured to obtain 180° peel adhesive strength. Result is shown in Table 1.

TABLE 1

Table 1 peel adhesive strength in Inventive Examples and Comparative Examples

| | Sample Name | Manufacturer | Material | Pressing at normal temperature (25° C.) Peel strength (N/cm) | Pressing at normal temperature (25° C.) Peel strength (N/cm) | Overall judgement |
|---|---|---|---|---|---|---|
| Inventive Example 1 | EMBLET FZ | UNITIKA | Fluoro-coated polyester | 0.01 (GOOD) | 0.01 (GOOD) | GOOD |
| Comparative Example 1 | TPX | Mitsui Chemicals | TPX | <0.005 (NG) | >0.20 (NG) | NG |
| Comparative Example 2 | CLEARAS | Sumitomo Osaka Cement | Nanoceramic-coated polyester | <0.005 (NG) | 0.01 (GOOD) | NG |
| Comparative Example 3 | Pakotan | Pakotan Technology | Acryl-mixed epoxy resin/polyester | <0.005 (NG) | 0.015 (GOOD) | NG |
| Comparative Example 4 | KUREHA KFC film | KUREHA | PVDF/ polyester | <0.005 (NG) | 0.045 (NG) | NG |
| Comparative Example 5 | SS1B | NIPPA | Fluoro-silicone/ polyester | <0.005 (NG) | 0.015 (GOOD) | NG |
| Comparative Example 6 | SS4C | NIPPA | Fluoro-silicone/ polyester | 0.01 (GOOD) | 0.04 (NG) | NG |

In Inventive Example 1, the composite sheet and the release film which were pressed at normal temperature were sufficiently in close contact, and no spontaneous separation occurred. When pressed at 130° C., the composite sheet and the release film did not fuse together, and exhibited low peel strength. Thus, the release film could be separated easily without leaving residue of the composite sheet (CB/PTFE), that is, without transfer of the composite sheet).

Films other than Inventive Example 1 (that is, Comparative Examples) exhibited some problem in adhesive force either after pressing at normal temperature, or after hot pressing at 130° C. There were cases where too large adhesive force caused breakage of the CB/PTFE composite sheet at the time of separation of the release film. There were cases where residue of the CB/PTFE composite sheet was transferred to the release film at the time of separation of the release film. There were cases where too small adhesive force led to shift of the composite sheet relative to the release film, and wrinkle or breakage of the composite sheet occurred.

In order to investigate possibility of transfer of the residue of the CB/PTFE composite sheet to the release film when release film is separated, by using the release film of Inventive Example 1 and the composite sheet, hot pressing (115 kgf, 4 minutes) at various temperatures in the range of 80° C.~170° C. was carried out after pressing at normal temperature (25° C., 115 kgf, 4 minutes) using the release film of Inventive Example 1 and the composite sheet. Presence or absence of transfer when the release film subjected to hot pressing at various temperatures was separated is shown in Table 2. There was no problem of transfer when hot pressing was performed at temperature of 80° C.~170° C.

TABLE 2

Release property by temperature of hot pressing
Unifying pressing (various temperatures) was
performed after pressing at normal temperature
(pressing at normal temperature): 115 kgf, 4 min
(unifying pressing): 115 kgf, 3 min

| Temperature of unifying pressing | Result of separation |
|---|---|
| 80° C. | ⊚ |
| 100° C. | ⊚ |
| 120° C. | ⊚ |
| 130° C. | ⊚ |
| 140° C. | ○ |
| 150° C. | Δ |
| 170° C. | Δ |

⊚—no transfer
○—little transfer
Δ—black transfer on the release film

REFERENCE SIGN LIST

10 polymer electrolyte membrane
20, 21 catalyst electrode layer
40, 41 gas diffusion layer
60, 61 separator
50a, 51a inlet side of fuel gas and oxygen containing gas (oxidizer gas)
50a, 51a outlet side of fuel gas and oxygen containing gas (oxidizer gas)

What is claimed is:

1. A method of laminating a composite sheet to MEA (Membrane Electrode Assembly) comprising the steps of:
    providing a membrane electrode assembly (MEA);
    providing a composite sheet comprising functional powder and polytetrafluroethylene (PTFE);
    providing a release film;
    superimposing the composite sheet on the release film and pressing them at a temperature of about 20° C.±15° C.;
    superimposing the composite sheet having the release film pressed at normal temperature thereto on MEA and hot-pressing them; and
    separating the release film from the composite sheet.

2. The method as claimed in claim 1, wherein, when the release film is separated from the composite sheet, 180 degree peel adhesive strength (in accordance with JIS K6854-2: 1999) of the release film is not less than 0.005 N/cm and not more than 0.025 N/cm.

3. The method as claimed in claim 1, wherein the temperature of hot pressing is in the range of 100° C.-140° C.

4. The method as claimed in claim 1, wherein the functional powder contains at least carbon black, activated carbon, or a mixture thereof.

5. The method as claimed in claim 1, wherein the composite sheet is porous.

6. The method as claimed in claim 1, wherein, after the release film is separated from the composite sheet, a part or all of the composite sheet is not transferred to the release film.

7. The method as claimed in claim 1, wherein, in the composite sheet pressed to the release film at normal temperature, there is no shift in position of the composite sheet relative to the release film, and no wrinkle or breakage of the composite sheet occurs.

* * * * *